UNITED STATES PATENT OFFICE.

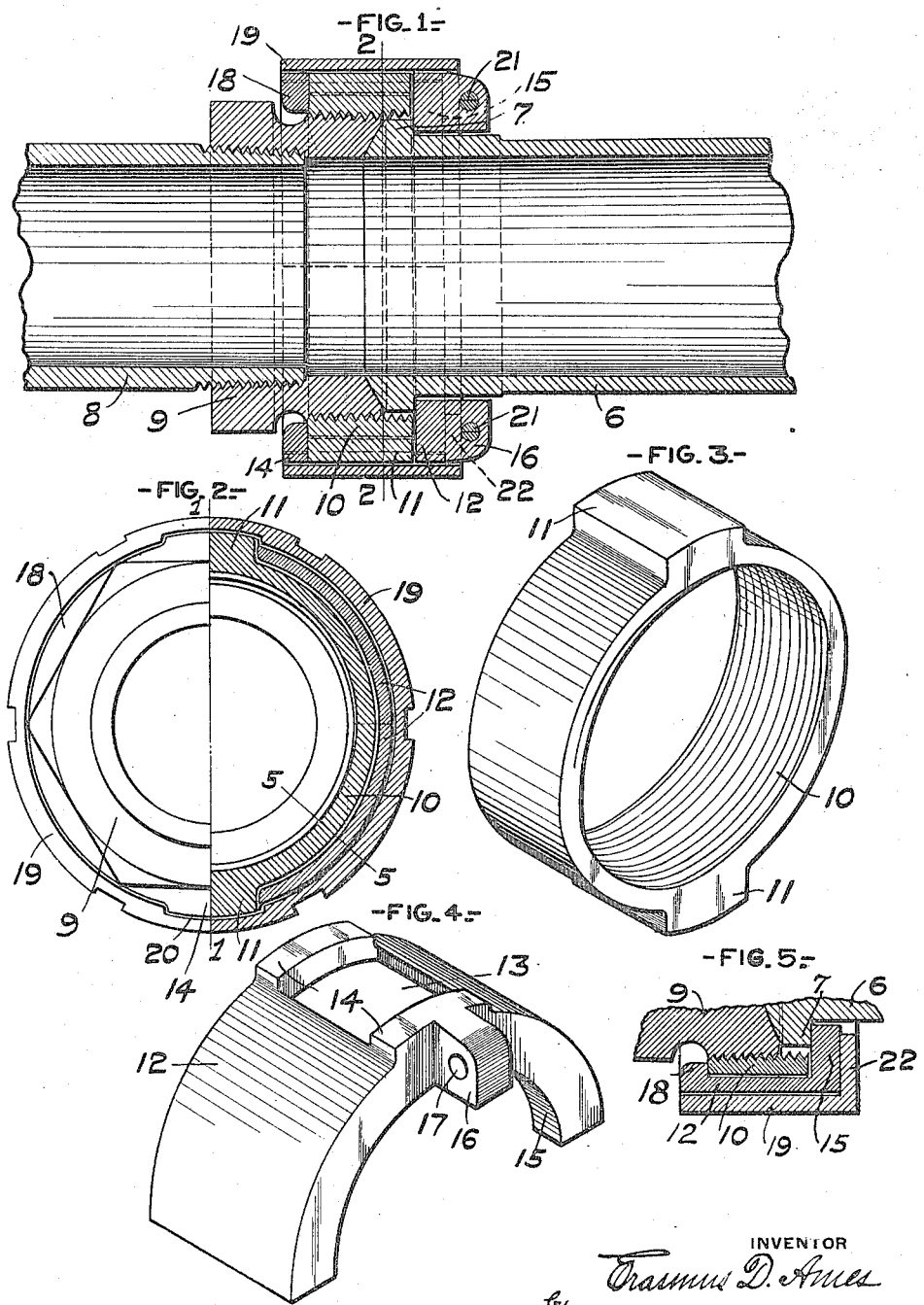

ERASMUS D. AMES, OF SCRANTON, PENNSYLVANIA, ASSIGNOR OF FORTY-FIVE ONE-HUNDREDTHS TO TOMMA M. GAPP.

PIPE-COUPLING.

1,197,093. Specification of Letters Patent. Patented Sept. 5, 1916.

Application filed February 21, 1916. Serial No. 79,504.

*To all whom it may concern:*

Be it known that I, ERASMUS D. AMES, a citizen of the United States, residing at Scranton, in the county of Lackawanna and State of Pennsylvania, have invented a certain new and useful Improvement in Pipe-Couplings, of which improvement the following is a specification.

This invention relates to detachable pipe couplings, and more particularly to devices of this character in which the coupling nut is formed in separable sections, the objects being to provide an integral unbroken threaded sleeve for the inside portion of the sectional nut; to increase the shoulder bearing surface by providing a sectional ring having two shoulders or flanges at opposite ends of the threaded sleeve; to make the threaded sleeve reversible, whereby the life of the coupling is greatly increased; and to provide a simple, compact, durable construction which may be readily applied and detached from the pipe sections.

With these objects in view, my invention comprises certain improved elements of construction, all of which will now be more fully described, the novel features being pointed out in the claims.

In the accompanying drawings: Figure 1 is a central longitudinal section, taken on the line 1—1 of Fig. 2, and showing one form of coupling embodying my improvement; Fig. 2, a view, half in end elevation and half in transverse section taken on the line 2—2 of Fig. 1; Fig. 3, a perspective view of the inner threaded sleeve forming a portion of the union or coupling nut; Fig. 4, a perspective view of one of the sectional members of the ring for inclosing the threaded sleeve; and Fig. 5, a longitudinal section taken on the line 5—5 of Fig. 2.

According to the construction shown in the drawing, the pipe section, 6, is provided with the usual outwardly projecting circular flange or shoulder, 7, and the pipe section, 8, is attached to the customary threaded head, 9, having a square or hexagonal end, the head being provided with a beveled or concave surface at its inner end adapted to engage a corresponding surface at the end of the pipe section, 6, and form a tight joint therewith when the parts are clamped together, by screwing up the union or coupling nut.

According to my improvement, the union or coupling nut is formed in several detachable parts, comprising an integral interior threaded sleeve, 10, for engaging the threaded head, 9, the interior diameter being sufficiently large to pass over the shoulder, 7, of pipe section, 6, a sectional ring, 12, inclosing said threaded sleeve, and a retaining ring, 19, for inclosing and holding the sectional ring. The ring, 12, may be formed in two or more separable sections having recesses or openings, 13, for receiving the projections, 11, on the sleeve, 10. The sectional ring is also provided with two inwardly extending flanges or shoulders, 15 and 18, at opposite ends of the sleeve, one of these flanges, such as 15, extending inward farther than the other, and engaging the shoulder, 7, of the pipe section, 6, while the other flange, 18, engages the end of the sleeve, 10, and transmits thereto the pull or force exerted in screwing up the coupling.

The sectional ring, 12, and retaining ring, 19, are provided with coöperating projections, such as 14, and longitudinal grooves, such as 20, for preventing relative rotary movement, but to permit detaching the parts by a longitudinal sliding movement, and any suitable fastening means may be employed. As here shown, the sectional ring, 12, is provided with lugs, 16, projecting through openings in the flange, 22, and having holes, 17, for cotter pins, 21. The threaded sleeve, 10, is made reversible so that when the threads at one end where it engages the threaded head, 9, become worn, the sleeve may be turned end for end, thereby presenting the unused portion of the thread at the other end for engagement with the threaded head, 9, and thereby greatly increase the useful life of the coupling.

The parts of the coupling may be readily detached by simply removing the cotter pins and sliding the retaining ring longitudinally from the sectional ring, whereupon the sections of ring, 12, may be removed laterally from the sleeve, and the latter slipped over the shouldered end of the pipe. By reversing the operation, the coupling may be readily applied to couple up two pipe sections wherever desired, as will be easily understood. It will be noted that when the assembled union nut is screwed up on the threaded head, 9, to tighten the coupling, the flange, 15, of the sectional ring, 12, engages the shoulder, 7, of pipe section, 6, and transmits the force of the pull through the ring, 12, to the flange, 18, and the other end of the sleeve, 10, thereby providing a compact and durable form of coupling.

Having now described my invention, what I claim as new and desire to secure by Letters Patent is:

1. In a pipe coupling, the combination with a threaded head and a pipe section having a shoulder, of a union nut device comprising a threaded sleeve, a sectional ring inclosing the sleeve, and a retaining ring inclosing the sectional ring.

2. In a pipe coupling, the combination with a threaded head, and a pipe section having a shoulder, of a union nut device comprising a threaded sleeve, a sectional ring inclosing the sleeve and having a flange at one end engaging said shoulder and a flange at the other end engaging said threaded sleeve, and a retaining ring inclosing said sectional ring.

3. In a pipe coupling, the combination with a threaded head, and a pipe section having a shoulder, of a union nut device comprising a threaded sleeve, a sectional ring inclosing the sleeve, the sleeve and sectional ring having coöperating projections and recesses, and a retaining ring provided with interior longitudinal grooves.

4. In a pipe coupling, the combination with a threaded head, and a pipe section having a shoulder, of a union nut device comprising a threaded sleeve, a sectional ring inclosing the sleeve, an integral retaining ring inclosing the sectional ring, and means for securing said sections to the retaining ring for preventing relative longitudinal movement.

5. In a pipe coupling, the combination with a threaded head, and a pipe section having a shoulder, of a union nut device comprising a reversible sleeve, having an interior thread extending from end to end, a sectional ring inclosing the sleeve, and a retaining ring inclosing the sectional ring.

6. In a pipe coupling, the combination with a threaded head and a pipe section having a shoulder, of an internally threaded sleeve engaging said head, a sectional ring inclosing said sleeve and having an inwardly extending flange at one end engaging said shoulder and a flange at the other end engaging said sleeve, coöperating projections and recesses between the sleeve and said sectional ring, and a retaining ring having interior longitudinal grooves engaging corresponding projections on said sections.

7. In a pipe coupling, the combination with a threaded head and a pipe section having a shoulder, of an internally threaded sleeve engaging said head, a sectional ring inclosing said sleeve and having an inwardly extending flange at one end engaging said shoulder and a flange at the other end engaging said sleeve, a retaining ring inclosing said sections and having an inwardly extending flange, said sections being provided with lugs extending through openings in the flange of said retaining ring, and fastening means for said lugs.

In testimony whereof I have hereunto set my hand.

ERASMUS D. AMES.

Copies of this patent may be obtained for five cents each, by addressing the "Commissioner of Patents, Washington, D. C."

It is hereby certified that in Letters Patent No. 1,197,093, granted September 5, 1916, upon the application of Erasmus D. Ames, of Scranton, Pennsylvania, for an improvement in "Pipe-Couplings," an error appears requiring correction as follows: In the grant and in the heading to the printed specification, assignment, for the words "forty-five one-hundredths" read *fifty-five one-hundredths;* and that the said Letters Patent should be read with this correction therein that the same may conform to the record of the case in the Patent Office.

Signed and sealed this 3d day of October, A. D., 1916.

[SEAL.]
F. W. H. CLAY,
*Acting Commissioner of Patents.*